United States Patent Office 3,301,106
Patented Jan. 31, 1967

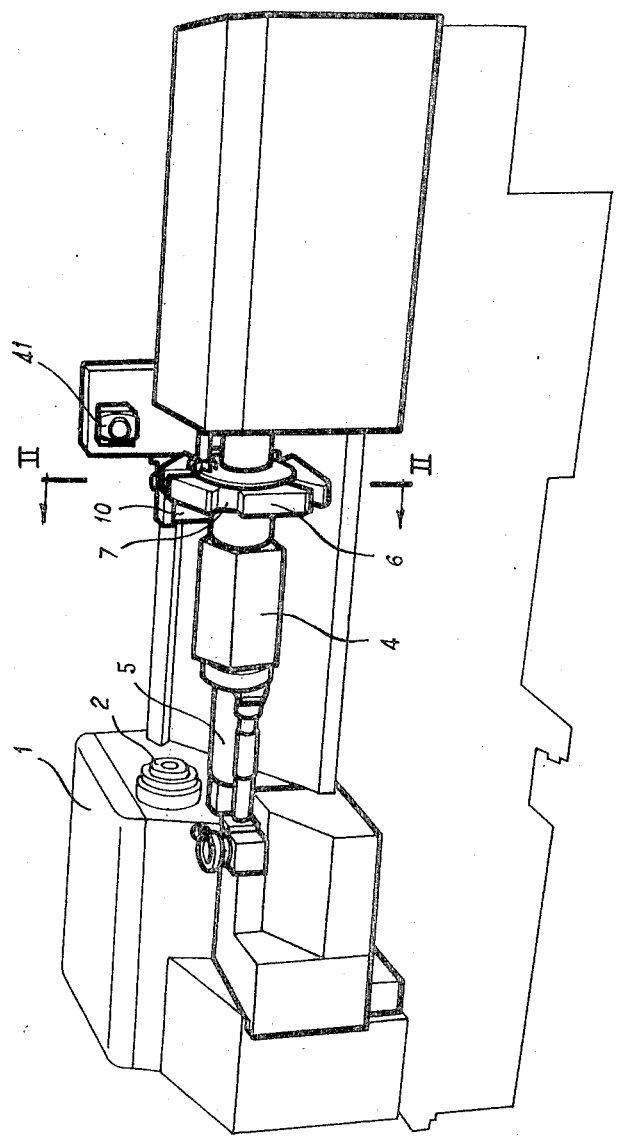

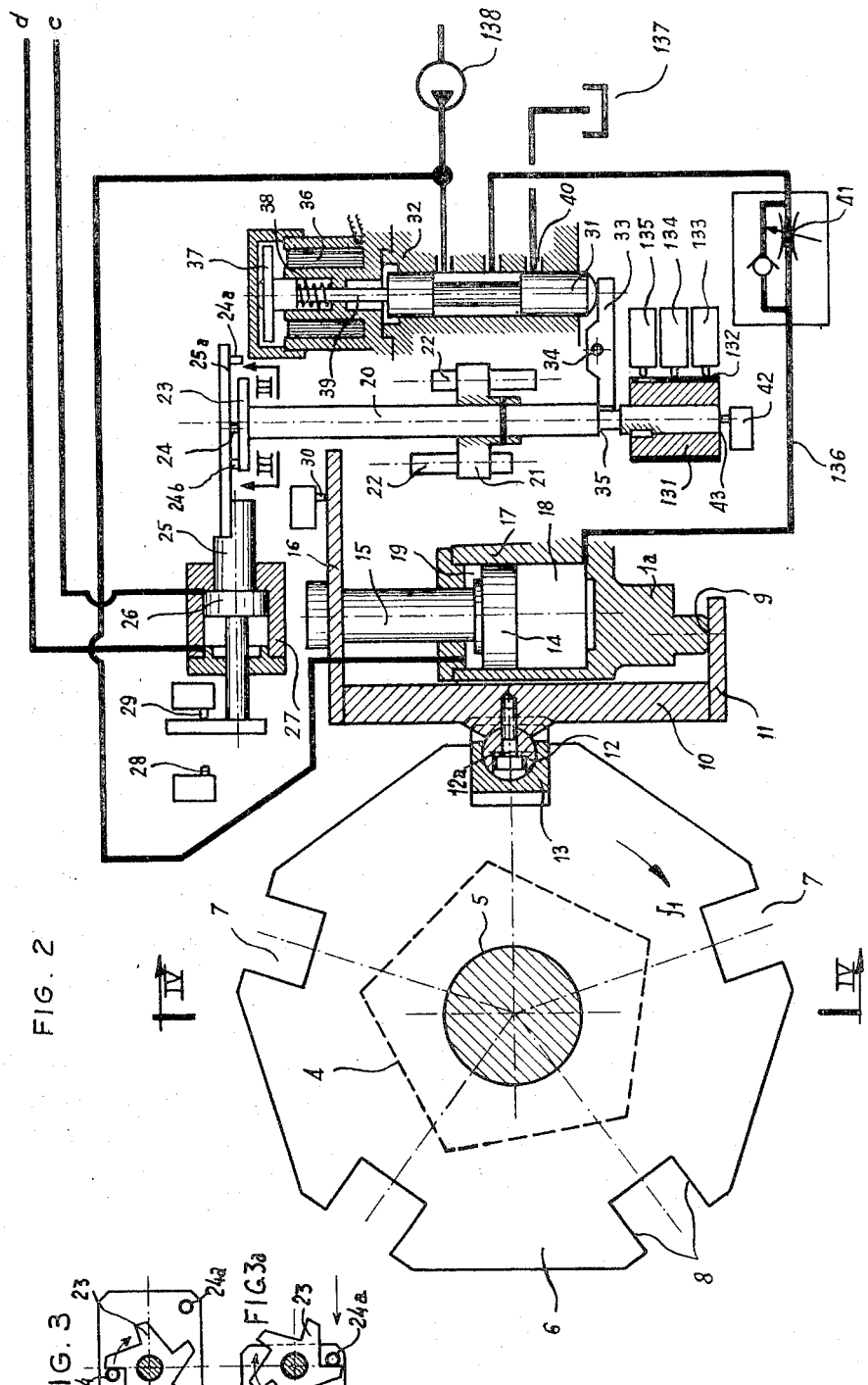

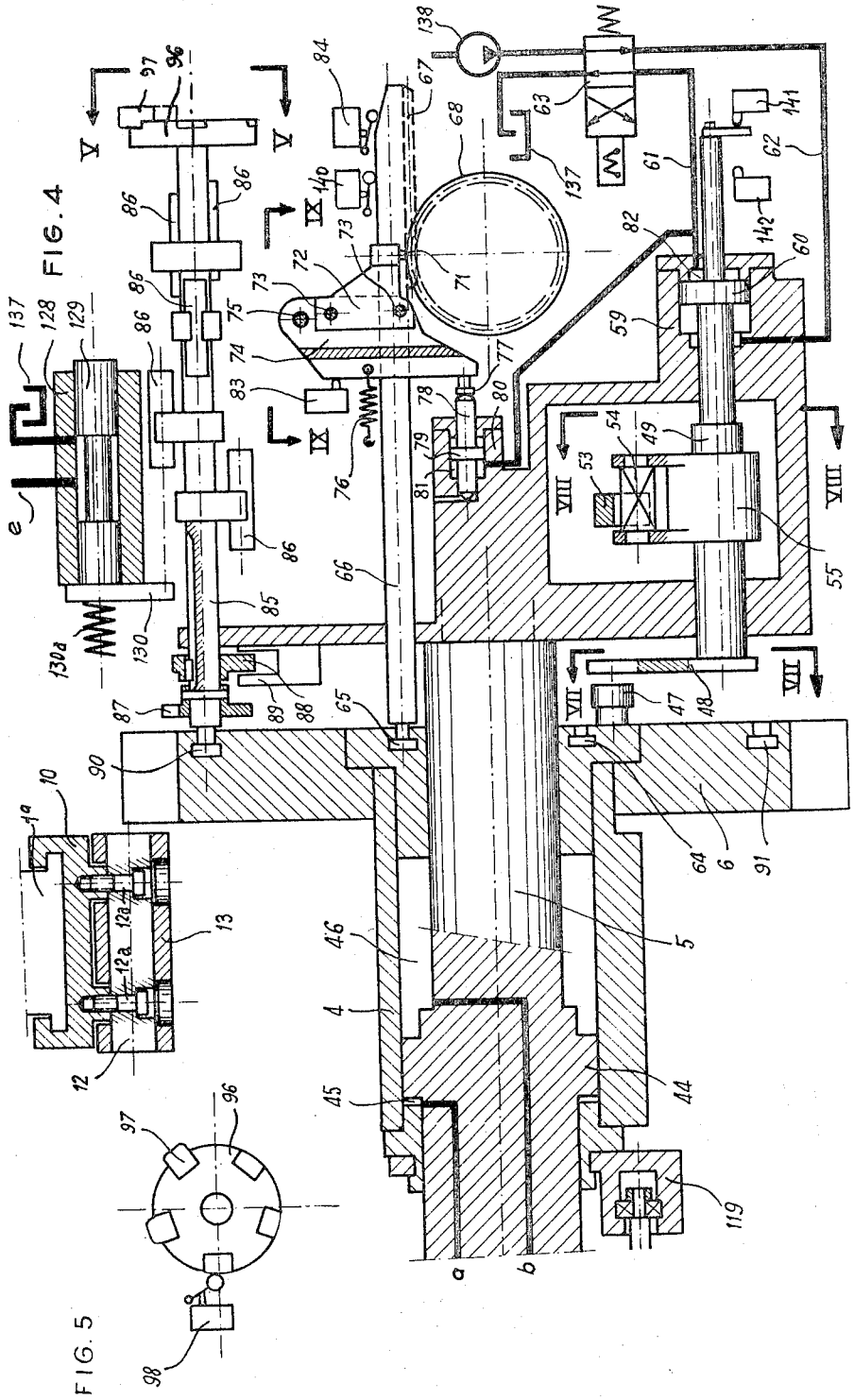

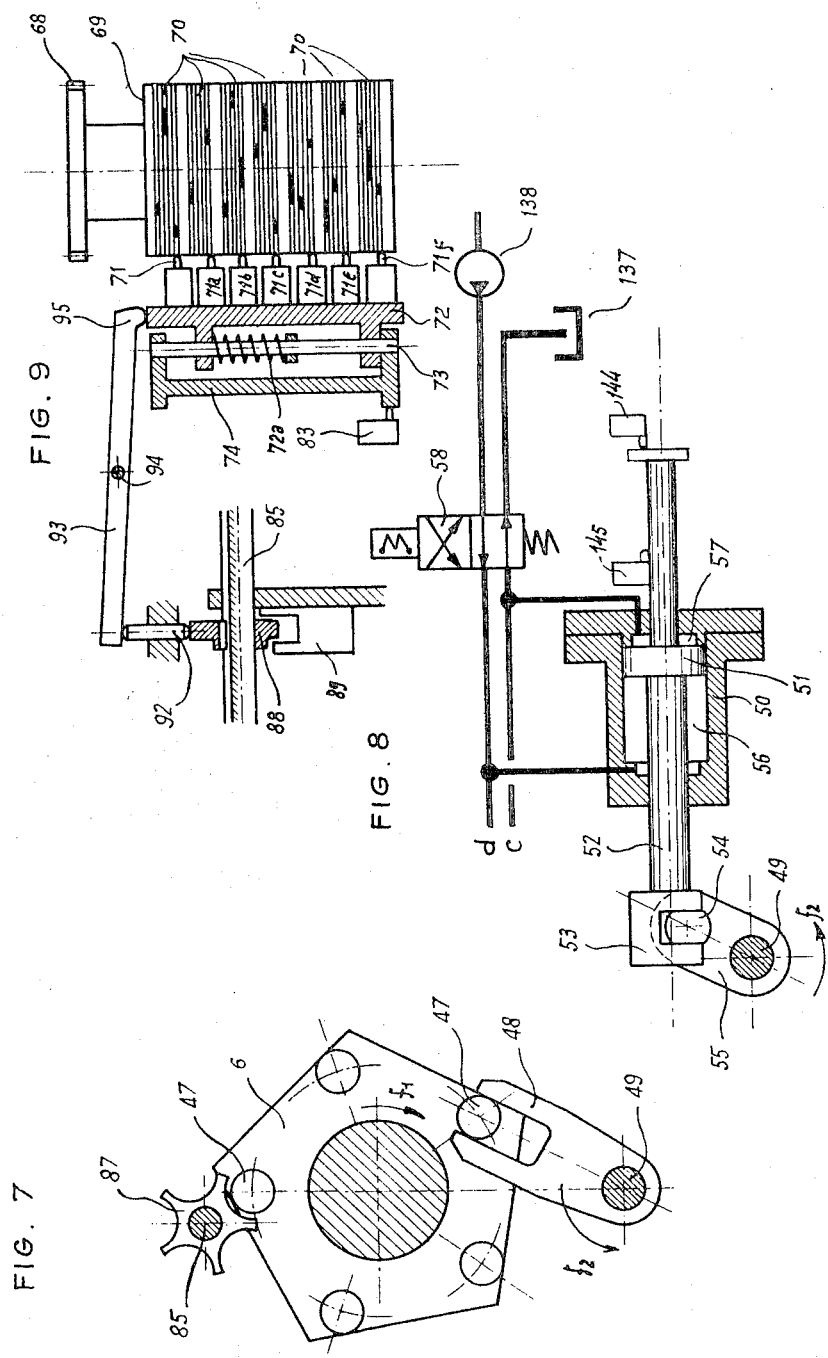

3,301,106
LATHES
Rene Jean Nicolas Le Brusque, Malakoff, Seine, France, assignor to H. Ernault-Somua, Paris, France, a company of France
Filed Sept. 11, 1964, Ser. No. 395,695
Claims priority, application France, Sept. 25, 1963, 948,596
8 Claims. (Cl. 82—21)

The invention relates to lathes having a tool-holding capstan assembled so as to be able to be subjected to a revolving motion about an axis parallel to the lathe spindle and a motion of translation in a direction parallel to said axis.

With regard to the revolving motion, it is necessary on the one hand to be able to make the capstan turn about its axis in order to occupy the different angular indexing positions for which the tools carried by its faces successively present themselves at the working station and, on the other hand, it is advantageous to have said capstan carry out an oscillating or angularly balancing motion having for its origin each of said angular indexing positions so as to confer to the tools a transverse motion, e.g. for a shoulder surfacing operation.

Moreover, to ensure the precision of the operation as well as the surface quality and finish the angular position of the capstan and, more particularly, each of its indexing positions must at any time be determined with precision, i.e. by elements which are not subjected to the effects of various clearances.

In lathes of the type considered each of the indexing positions of the capstan is determined by a reference member which assumes only this particular function, and the angular balancing motion of the capstan is determined by a mechanism which is independent from said reference member. This has for effect that at the moment when the capstan stops being blocked by said reference member to be taken over by the angular balancing mechanism, and vice-versa, it is possible and even likely that some of the play is taken up, which is prejudicial both to the precision and the quality of the work and may lead to a tool breakage. Indeed, when the angular balancing motion of the capstan is initiated the tool is generally carrying out its operation and, consequently, engaged with the work-piece, so that the reaction to which it subjects the capstan—by resting on the work-piece—is liable to cause the play to be taken up at that very moment. Furthermore, the amplitude of the angular balancing motion, i.e. the location of its point of departure and its point of arrival, with respect to the indexing position does not always present the desired precision.

It is the object of the invention to realize a capstan lathe of the type considered which overcomes this drawback.

To this effect, in a lathe according to the invention the member which maintains the capstan in each of its angular indexing positions is movable on the lathe frame between a stationary stop block which determines said position and an extreme position which determines the position of maximum amplitude of the angular balancing motion of the capstan which is caused by the displacement of said maintaining member which permanently determines the angular position of the capstan under the effect of convenient control means.

Thus, from the moment when the capstan initiates an operating cycle, and whichever the succession of its motion of translation in one or the other direction and its pivoting movements in one direction or the other, it never ceases to be under the control of said single maintaining member which ensures maintenance of the angular position thereof. This condition is particularly favorable for obtaining a high precision work-piece. Moreover, a structure of this kind easily submits to a control of its movements when running.

In one embodiment of the invention, the member which permanently determines the angular position of the capstan is constituted by a prismatic guide adapted to engage with any one of a series of radial grooves provided at the periphery of a plate which is integral with the capstan, said guide being connected to a movable slide table in an orthogonal direction with respect to the capstan axis, and subjected to the effect of the aforementioned control means.

Thus, it is this guide which during the whole of the duration of a capstan operating cycle maintains the latter in its angular reference indexing position and confers the angular balancing motion thereto. It offers the advantage of allowing to determine with great precision the distance between the tool and the work-piece during the machining operations since it is possible to provide the same with a relatively great diameter and, more particularly, with a diameter greater than the diameter within whose limits the tools perform their revolving motions, so that a displacement of the slide table causes the capstan to perform an angular movement which displaces the centre of the tool over a much shorter distance.

Furthermore, in the case of a longitudinal machining operation such as turning along or boring by means of a sole tool, it has been customary hitherto in capstans with an angular balancing motion to utilize this movement to carry the tool to its precise adjusting position rather than displace the tool on its support, or displace the tool support on the capstan. To this effect mechanical end stops or electrical contacts have been used to obtain the desired position. The purely mechanical stops necessitate the display of relatively considerable forces and therefore do not lead to a very high precision, and electrical contacts procure by far not all of the desirable precision either.

This drawback can be overcome by another characteristic feature of the invention according to which the slide table carrying the guide which maintains the angular position of the capstan is connected to one of the members of a hydraulic jack which is stopped as soon as it is equilibrated under the control of a hydraulic slide-valve controlled by a micrometric stop which is actuated by said slide table.

Hence, only an insignificant effort is required from this micrometric stop to place the slide-valve in the position which corresponds to the balancing of the jack, so that an extraordinary precision can be obtained. In addition, it is possible to adjust this position, even during operation of the lathe.

A better understanding of the invention is to be gained from the description hereafter as well as from the accompanying drawings which show, by way of example, one embodiment of a lathe according to the invention, and wherein:

FIG. 3 is a view along III—III of FIG. 2.

FIG. 3a is similar to FIG. 3 and show the elements in a different position.

FIG. 4 is a sectional view taken along IV—IV of FIG. 2, the capstan being supposed to have been brought back to the end of its axial stroke which is at the greatest distance from the fast head stock.

FIG. 5 is a view along V—V of FIG. 4.

FIG. 7 is a sectional cut along VII—VII of FIG. 4.

FIG. 8 is a cut along VIII—VIII of FIG. 4.

FIG. 9 is a view according to IX—IX, FIG. 4.

Figures 1, 10:
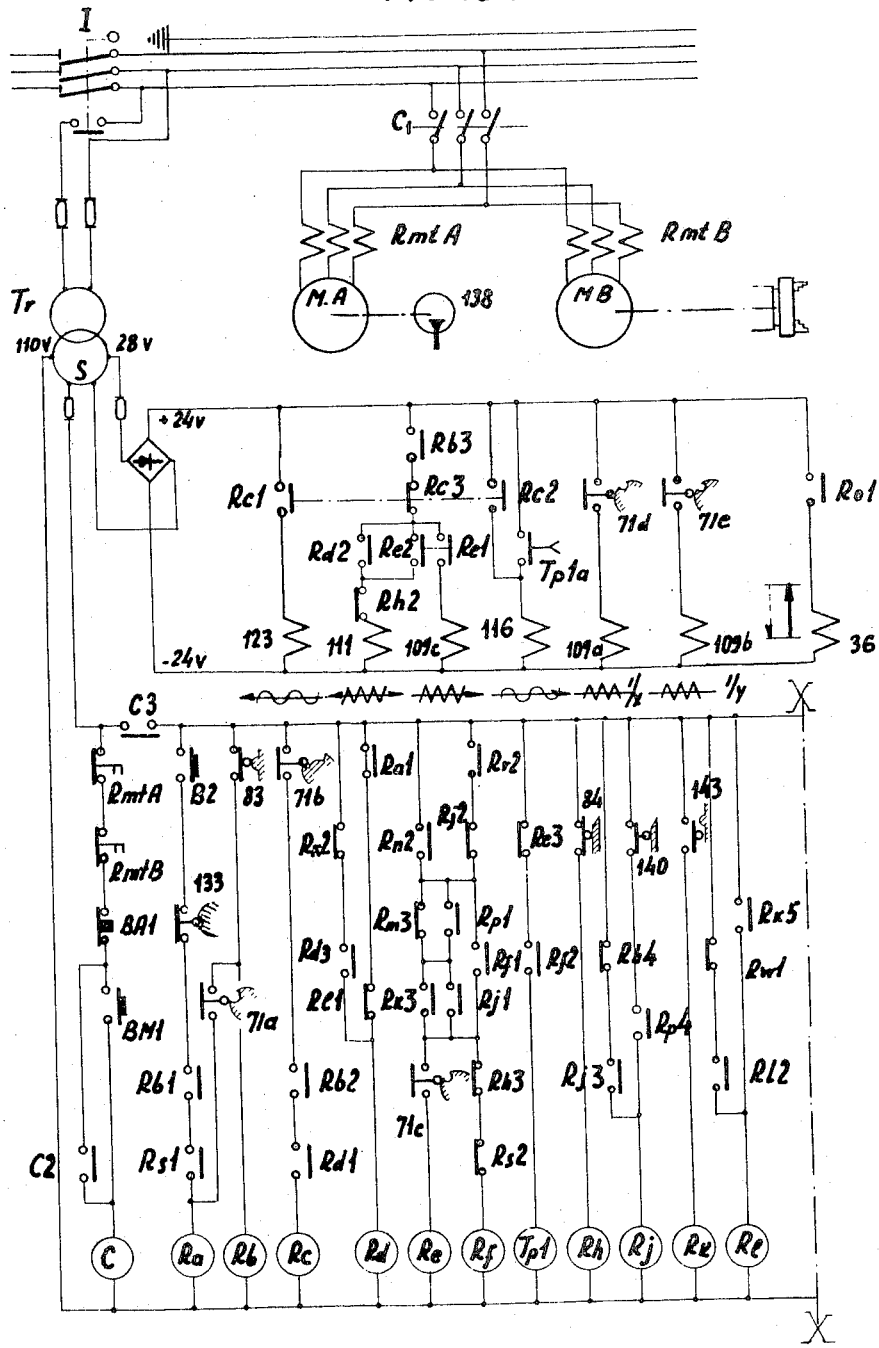
FIG. 1 is a perspective view of a capstan lathe according to the invention, all of the characteristic elements of the invention being shown in thick lines, and the capstan being shown at an intermediary point of its axial stroke.
Figures 2, 10:
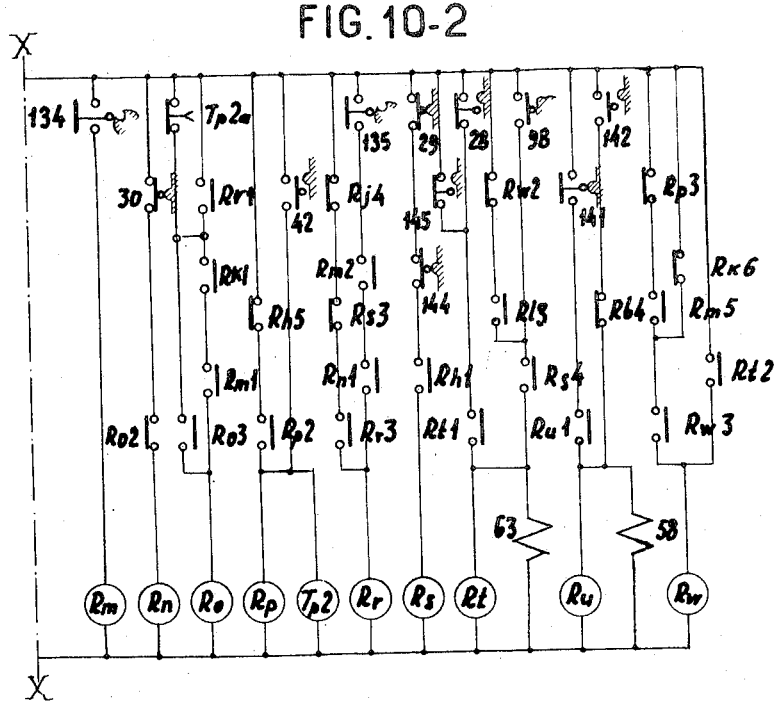
FIG. 2 is a sectional view according to line II—II of FIG. 1, taken through a perpendicular plane with respect to the axis of the capstan.
Figure 11:
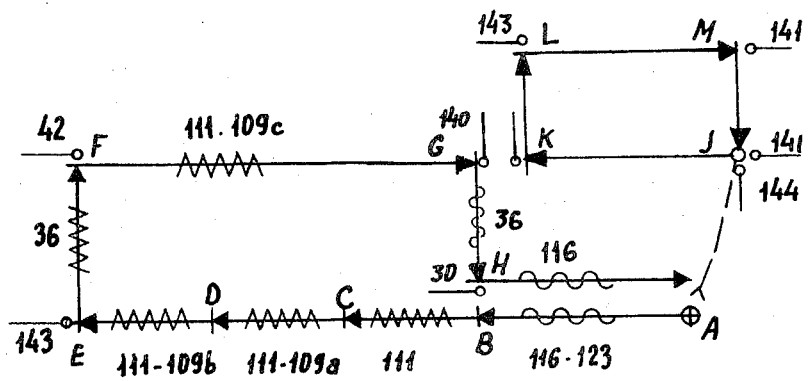

FIG. 10 which is constituted by FIGS. 10–1 and 10–2 overlying each other along line X—X is the electrical connecting diagram of the lathe, and FIG. 11 is the image of an automatic machining cycle chosen by way of example.

The lathe shown in FIG. 1 comprises a head-stock 1 the spindle 2 of which can carry the clamping for the work-piece to be machined, e.g. a chuck.

The lathe comprises in addition a prismatic cutter-block capstan which, in this example, has five faces and is assembled so as to be able to turn and slide on a shaft 5 the axis of which is parallel to that of lathe spindle 2.

Capstan 4 carries a plate 6 at the periphery of which are provided grooves 7 the number of which is equal to that of the capstan faces and the sides 8 (FIG. 2) of which are parallel in this embodiment.

A stop block 9 (FIG. 2) is used as precision indexing stop for the angular position of capstan 4. This indexing position is obtained by means of a slide-table 10 which is displaceable in a stationary zone 1a integral with the frame of the lathe and which carries a small plate 11 which engages with indexing stop 9. On slide-table 10 is fixed, by means of screws 12a, an axis 12 which is parallel to the axis of the capstan and on which a guide constituted by a prism 13 can oscillate without any noticeable clearance.

The width of prism 13 is such that the latter can be housed exactly between the faces 8 of any one of grooves 7, with a minimum clearance. Thus capstan 4 can move longitudinally on its axis with respect to prism 13 whose longitudinal position is stationary. Prism 13 does not extend over the whole length of the axial stroke of plate 6, so that when capstan 4 has reached the end of its axial stroke the farthest away from headstock 1 of the lathe, plate 6 is freed from prism 13, and the capstan can be turned about its shaft 5.

Slide 10 is controlled by a piston 14 the rod 15 of which is connected to said slide by a small plate 16.

Piston 14 is housed within the cylinder of a hydraulic jack 17 which it divides in two chambers 18 and 19.

When the hydraulic jack 17 is operating, slide 10 moves carrying along prism 13, thus determinating an angular movement of capstan 4 about its shaft 5.

The angular position of capstan 4 is always perfectly precise, from its indexing position ensured by stop 9 to any predetermined position obtained by a rotation caused by a displacement of slide 10. Prism 13 remains always engaged in a groove 7 of the capstan during one oscillation of the latter, either to move away from the indexing position, or to come back thereto.

The successive angular positions which capstan 4 must occupy on its shaft 5 can be determined in an extremely precise and entirely automatic way by a hydraulic device comprising stops which can be adjusted with precision.

This device comprises a bar 20 rotable about its axis and carrying a support 21 which receives various stops 22 with adjustable positions. When rotating, stop bar 20 can carry one of stops 22 to the path of an extension of plate 16 which is integral with the slide.

Each stop 22 is placed into its active position by a star 23 which is integral with bar 20 and located on the path of two stubs 24, 24a carried by a plate 25a integral with rod 25 of a piston 26 which is movable in a hydraulic cylinder 27. The jack constituted by a cylinder 27 and piston 26 is fed through hydraulic conduits c and d. At each forward and return movement of piston 26, the stop bar 20 rotates about a convenient angle to substitute one stop 22 for another one. A supplementary stub 24b which is also carried by a plate 25a blocks star 23 in the position shown in FIGS. 2 and 3.

Electric limit switches 28 and 29 are used for checking that piston 26 has reached one of the two limit positions which it must occupy to ensure the correct successive positioning of stops 22.

An electric limit switch 30 which is placed before the extension of plate 16 integral with slide 10 serves for controlling that slide 10 has come back to the indexing position against stop 9.

Stop bar 20 is mounted in such a way that it can be subjected to slight longitudinal displacements. During these displacements, it acts upon slide 31 of a valve 32 by means of a lever 33 which rotates about an axis 34. Bar 20 acts on lever 33 through a stub 35.

FIG. 2 shows valve 32 in the position where slide 10 engages stop 9. An electro-magnet 36 comprises a movable armature 37 which is normally pushed upwardly by spring 38 and the rod 39 of which is adapted to push slide 31 downwardly when the electro-magnet is energized. In this case, armature 37 is attracted and compresses spring 38 whereas slide 31 is pushed back downwardly and frees an orifice 40 which connects chamber 18 of hydraulic jack 17 to the oil tank. Chamber 19 being always fed with oil under pressure, piston 14 descends and causes the capstan to pivot in the direction indicated by arrow $f_1$.

The pivoting speed of the capstan can be adjusted by a freely adjustable throttle 41, which is located on the connecting duct 136.

When plate 16 has come to engage stop 22, it determines a slight downward movement of stop bar 20 and, consequently, the upward movement of slide 31 so that orifice 40 is partially obturated thus determining the equilibrium of the forces which act upon both sides of piston 14 in the hydraulic jack 17. The jack is stopped at a point of hydraulic equilibrium in a position which, consequently, may be determined with the greatest precision.

The device is completed by an electric contact 42 which is engaged by the end 43 of stop bar 20 just before said stop bar starts acting upon slide 31. This contact 42 is time-delayed so as to determine control of the ensuing operations with a short delay, i.e., when the point of hydraulic equilibrium has actually been reached by means of valve 32.

FIGS. 4 and 5 are concerned with the longitudinal displacement of capstan 4. It is indeed necessary, not only when operating, to displace the tool-carrying capstan but also to permit grooves 7 being disengaged from prism 13 when it is desired to cause the capstan to pivot to place other tools in operating position.

To disengage a groove 7 from prism 13 it is necessary to carry capstan 4 to a withdrawing position which is shown in FIG. 4.

The longitudinal displacements of the capstan are controlled by a hydraulic jack the cylinder of which is constituted by the inside of the capstan itself and the piston 44 of which is integral with shaft 5. Piston 44 divides the cylinder into two chambers 45 and 46 fed by hydraulic conduits a and b, respectively.

Plate 6 carries as many rolls 47 (FIGS. 4 and 7) as capstan 4 has faces. These rolls 47 are used for controlling the rotation of the capstan when it is desired to pass from one face to another one. They are driven by a fork 48 mounted on an axis 49 the rotation of which is controlled by a hydraulic jack 50 (FIG. 8). This hydraulic jack comprises a piston 51 integral with an axis 52, which ends in a fork 53 the prongs of which engage with an axis 54 with flattened ends which is carried by a lever 55 integral with axis 49.

Chambers 56 and 57 of the hydraulic jack are fed through conduits c and d by means of a hydraulic distributor constituted by an electro-valve 58.

When jack 50 is actuated, fork 48 rotates in the direction of arrow *f2* and drives capstan 4 in the direction of arrow *f1*, provided fork 48 is engaged with a roller 47.

To cause fork 48 to engage with roller 47 it is necessary to provoke a longitudinal displacement of axis 49 of the fork. This displacement is obtained through a jack 59 (FIG. 4) the piston 60 of which is integral with axis 49. The jack is fed through hydraulic conduits 61 and 62 provided with a distributor 63.

Plate 6 is provided with an annular groove 64 which retains the shouldered end 65 of a rod 66 slideably mounted in the frame of the lathe and which is terminated by the teeth of a rack 67 which engages with a pinion 68.

Thus, rod 66 can follow the longitudinal movements of the capstan without being rotatably driven by the latter.

On the axis of pinion 68 is provided a drum 69 (FIG. 9) carrying the information tracks 70 which are used to actuate switches 71, 71a, 71b, 71c, 71d, 71e, 71f, and which determine various movements of the lathe members.

These switches are carried by a support 72 slideable on two rods 73 carried by an assembly 74 which pivots about an axis 75 (FIGS. 4 and 9). The pivotable assembly 74 is pulled by a spring 76 and comprises a stop 77 abutting against the end of a rod 78. This rod 78 is the rod of piston 79 of jack 80 a chamber 81 of which can be fed with pressurized oil provided by the feeding conduit 61 of jack 59 which controls the longitudinal positioning of fork 48.

When fork 48 is engaged with roll 47, this means that a hydraulic pressure has built up in chamber 82 of jack 59 and, consequently, also in chamber 81 of jack 80. Piston 79 then pushes back stop 77 and causes assembly 74 to pivot in the direction which moves the electric switches such as 71 away from tracks 70. This movement is necessary since, as shall be explained hereafter, there exists a control capable of interfering to transversely displace the assembly of switches 71 with respect to tracks 70, so that if the switches were to remain against tracks 70 there would be a serious deterioration risk for these tracks.

A limit switch 84 which is actuated by the end of longitudinal bar 66 (FIG. 4) allows of controlling that the capstan has reached its backward position necessary for its angular indexing.

Moreover, FIG. 4 shows a stop bar 85 which carries stops 86 and the rotation of which is controlled by a star 87 integral with said bar and capable of engaging any one of rolls 47 during the rotating movement of the capstan in its return position (cf. FIG. 7).

Note: Stop bar 85 and longitudinal bar 66 are not actually located in the same plane in the finished machine (FIG. 4), but, in order to simplify the drawings they have both been shown in the plane of the sheet of paper in this figure; it is for this reason that the distance between the axis stop bar 85 and the capstan axis had to be exaggerated, so that rolls 47 which are carried by plate 6 integral with said capstan seem to describe a circumference which does not reach star 87 whereas actually, as can be seen in FIG. 7, these rolls 47 engage in turn with the hollow spaces between the teeth of said star.

Onto stop bar 85 is slideably keyed a cam 88 (FIGS. 4 and 9) which are maintained stationary in axial position with respect to the frame of the lathe by means of a fork 89 integral with said frame.

Stop bar 85 terminates in a shouldered head 90 engaged in an annular groove 91 of plate 6, in such a way that said bar moves longitudinally with the capstan and can turn only about its own axis when star 87 is driven by one of rolls 47.

When stop bar 85 is rotating, cam 88 acts upon a push-rod 92 (FIG. 9) which abuts against the end of a lever 93 which is pivotable about an axis 94 and the other end 95 of which rests against support 72 which is pushed by a spring 72a and onto which are fixed all of the electric switches such as 71. As a result of this, the rotating movement of the capstan can determine a change of tracks analysed by these switches.

Finally, the stop bar 85 carries a plate 96 (FIGS. 4 and 5) in the periphery of which riders such as 97 can be fixed which are capable of actuating an electric switch serving to control, for instance, the continuation of the passing movement from one face of the capstan to another, in case one or more of the capstan faces should be idle; in other words: to avoid that the capstan is stopped at certain undesired angular indexing positions.

Figure 6:
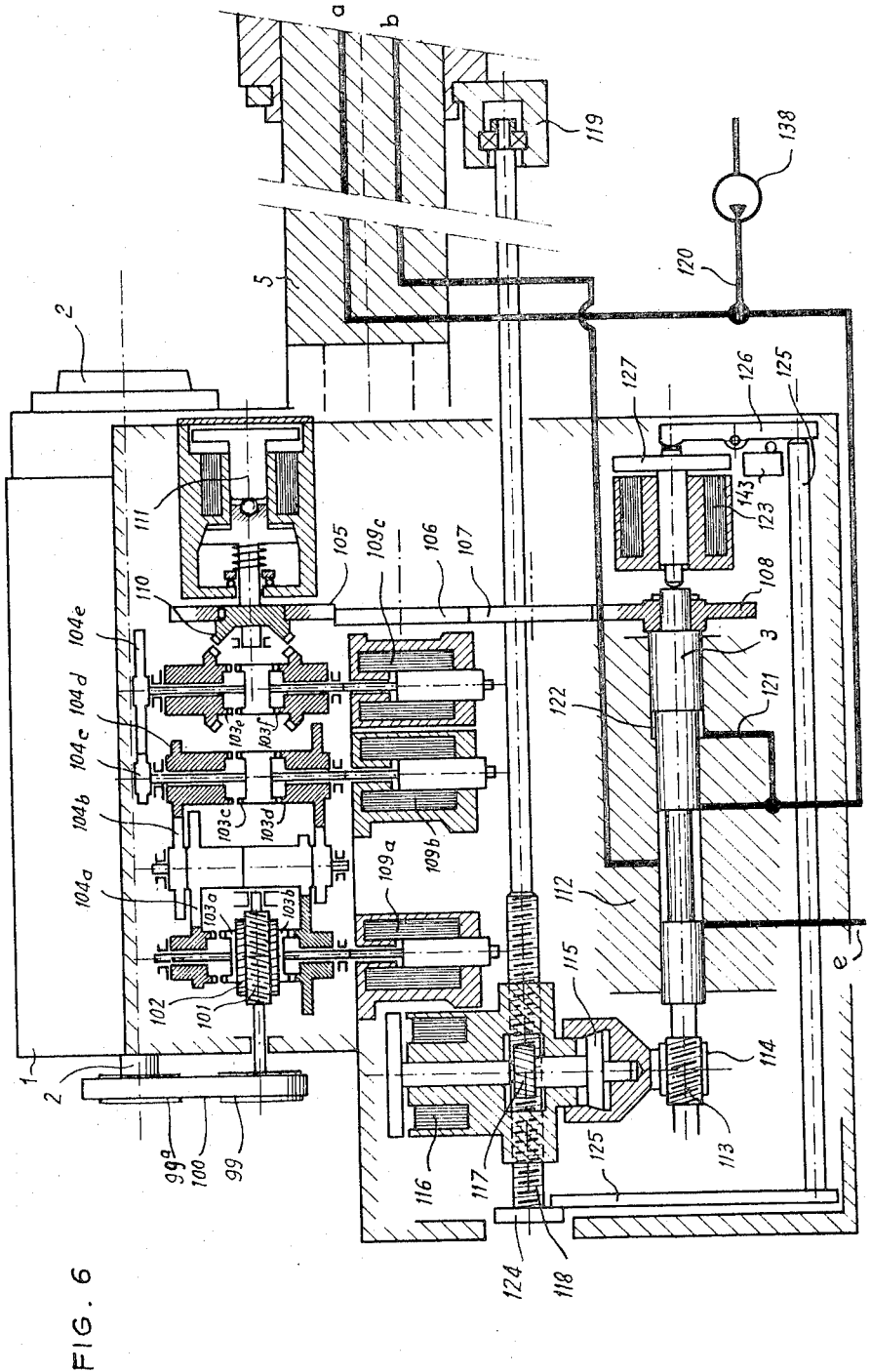
FIG. 6 is a sectional cut of the control box for the longitudinal advance movements of the capstan on its axis, through a vertical plan parallel to the axis of the capstan.

FIG. 6 is a sectional view of the control box for the longitudinal movements of the capstan.

The motion is picked up from the spindle 2 of the lathe and transmitted to a feed box by means of pulleys 99 and 99a, and a belt 100.

The movement that enters is transmitted to the feed box by means of an endless screw 101 and a toothed wheel 102. It is transmitted by dog-clutches 103a to 103f of pinions 104a to 104e to a sprocket-wheel 105, 106, 107 and 108.

This box which is not a constituent of the present invention may be of any convenient type. In the example shown it is actuated by electro-magnets 109a to 109c and comprises an inverting gear system 110, as well as an electro-magnetic clutch 111. In a preferred application, clutch 111 is constituted by a brake-clutch to obtain precise displacement stops.

Pinion 108 rotatively drives slide-valve 3 of a hydraulic valve 112, this slide-valve carries at one of its ends an endless screw 113 meshing with a toothed wheel 114. By means of clutch 115 driven by electro-magnet 116 in such a way that said clutch meshes when the electro-magnet is de-energized, toothed wheel 114 drives a helical gear 117 which meshes with a screw 118 acting, with respect to pinion 117, as a simple rack.

Screw 118 can only move in the longitudinal direction within the feed box housing and is connected to capstan 4 by means of a collar device 119 which permits the capstan to rotate.

Valve 112 is connected to hydraulic conduits *a* and *b* of the hydraulic jack which control the longitudinal movements of the capstan, and is fed by an inlet conduit 120. It may be of any type known per se which allows of equilibrating the forces which act upon the two faces of piston 44 (FIG. 4), or of disequilibrating said forces in one way or the other to determine the advance movement of the capstan in the corresponding direction.

Thus, the device described and shown in FIG. 6 comprises a rotating movement inlet from spindle 2 and an inlet for the motion of translation from the longitudinal displacement of the capstan actuated by the jack housed within said capstan.

These two movements are constantly compared and determine adjustment of valve 112, so that the longitudinal movements of the capstan are directly dependent from the movement given by the spindle.

The disengagement obtained when electro-magnet 116 is energized opens valve 112. A supplementary conduit 121 which opens into chamber 122 of the valve confers to the slide-valve a preferential motion towards the right (FIG. 6), and the disengagement permits this motion by determining the rapid longitudinal return of capstan 4.

The device further comprises an electro-magnet 123 capable of pushing the slide of the valve back towards the left, after disengagement obtained by means of electro-magnet 116. In this case, one obtains the rapid longitudinal advance of the capstan.

At the end of the rapid return of the capstan a stop 124 which is carried by screw 118 acts upon a system of rods 125 to push back, by means of a pivoting lever 126, the armature 127 of electro-magnet 123, and to re-equilibrate hydraulic valve 112, thus determining a precise stopping of the rapid return.

What has been described above concerns the operating displacements, as well as the rapid advance and return of the capstan.

FIGS. 4 and 6 further show elements which serve to obtain precise stoppings of the longitudinal movements of the capstan when operating, through stops 86 which are carried by stop bar 85.

A valve 128 which comprises a slide-valve 129 controls the stopping of the capstan. Slide-valve 129 is integral with a plate 130 located on the path of stop 86 which has been selected for obtaining the desired stopping position. Valve 128 is connected, on the one hand, through conduit *e* (FIG. 4) with the hydraulic circuit *e* (FIG. 6) of the longitudinal control of the capstan, and, on the other hand, with oil tank 137. Through a spring 130*a* slide-valve 129 is biassed in the direction of the connection of the valve with the oil tank.

When stop 86 comes into contact with plate 130, slide-valve 129 is displaced towards the left and partially obturates the outlet towards the hydraulic oil tank 137 until an equilibrium of the forces acting upon the faces of piston 44 has been obtained, which determines the precise stopping of the advance movement.

In the drawings all of the hydraulic feeds are diagrammatically shown by pumps 138.

The lathe which has been described hereinabove can, obviously, be completed by any electric installation deemed necessary for determining the operating cycles to be obtained, i.e. the sequency of the oscillating and longitudinal movements of the capstan.

This electric installation comprises, of course, switches 28, 29, 30, 42, 71, 71*a* to 71*f*, 83, 84, and 89, which have already been described above, as well as switches 133, 134 and 135 (FIG. 2) located in front of a drum 131 which is integral with stop bar 20, said drum comprising tracks 132 which are thus scanned by said switches 133 to 135. By way of example, and for each one of the angular positions of the stop bar 20 which corresponds itself to a given operating station of capstan 4, switches 133 to 135 permit, if desired, to use the oscillating movement of capstan 4 in order to realize a great variety of machining cycles in combination with the main longitudinal displacement of the capstan.

FIG. 4 further shows two limit switches 141 and 142 which are actuated by the rod of piston 60 of jack 59, as well as an intermediate switch actuated, as switch 84, by longitudinal bar 66 (FIG. 6), a switch 143 actuated by pivotable lever 126 and, finally, in FIG. 8, two limit-switches 144 and 145 actuated by the rod of piston 50 of jack 49.

I shall now describe an exemplary automatic machining cycle carried out on this lathe. The origin of the cycle is to be found at point A of the diagram in FIG. 11, this point corresponds to the longitudinal position of the capstan at the greatest distance from the headstock of the lathe. The workpiece-carrying spindle is rotating. The capstan starts by effecting a rapid approaching movement from point A to point B, then from point B to point C, at a normal operating advance speed which shall be called hereinafter normal operating advance speed 1/1; from point C to point D a movement at slow operating speed 1/$x$; then, from point E, a movement at slow operating speed 1/$y$. At this point E one confers to the capstan the first phase of an oscillating or angular balancing movement the amplitude of which is materialized in the diagram by the distance of points E and F, this movement being carried out at a normal operating speed, for instance for the facing of a shoulder. Then, while being left in the angular position it has just reached, the capstan is subjected to a longitudinal return travel from point F to point G at normal operating advance speed, e.g, to carry out a finishing operation on a bore roughly turned during the "advance" stroke of the capstan. To this effect, a double tool is used which comprises a rough cutting tool which operates during the "advance" travel, and a finishing cutter which operates during the return travel.

At point G the capstan is subjected to the second phase of its angular balancing movement, in other words it is made to pivot in the opposed direction from point G to point H where it resumes its angular indexing reference position; in the example considered, this pivoting movement is supposed to be carried out a high speed. At last the capstan is brought back, by a movement of axial translation, from point H to its point of departure A. The actual machining cycle is then finished, but it remains to index the capstan angularly, operation which is represented diagrammatically by the rectangular J, K, L, M, J in FIG. 11. Arrow JK symbolizes the axial movement carried out by fork 48 (FIGS. 4 and 7) in order to engage with the corresponding roll 47; arrow KL symbolizes the pivoting motion of the fork, i.e. the indexing of the capstan at ⅕ turn; arrow LM symbolizes the return movement of the fork and, consequently, its disengagement from the roll, and, finally, arrow MJ symbolizes inverse pivoting motion of the fork when returning to its initial position.

It will be noted that during the duration of the machining cycle, from the moment when a groove 7 of the plate 6 has been engaged on prism 13, the capstan has been angularly maintained by said member, without interruption, and, consequently, with great precision without any possibility of clearances being taken up, until completion of its return to the initial point A.

I shall now describe in detail this automatic machining cycle, with reference to the electric layout in FIGS. 10–1, 10–2.

The manually controlled general interruptor I is closed. The primary of transformer Tr is fed by two phases of the triphase distributing network, and the secondary delivers a 28 volt tension which is rectified and gives, on the one hand, a 24 volt tension to the various control electro-magnets and, on the other hand, an alternate 110 volt tension for direct feeding of the trip coils.

Push-button BM1 is pushed down whereupon the coil of contact C is feed through the stop push-button BA1 and through the two contacts of the magneto-thermic circuit-breakers which are located, respectively, on the feeding circuit of the spindle motor MB and the advance motor MA which drives pump 138 which furnishes the pressurized oil. Energizing of the coil of contact C causes the tripolar contacts C1 of said contacts to be closed. The spindle motor and the advance motor start rotating.

The auxiliary contact C3 of contact C closes and ensures the feeding of the relay control circuit.

To initiate an automatic cycle push-button B2 is pushed down. Contact 133 which is controlled by the information drum 132 (FIG. 2) is closed. Contact R$b$1 is closed since relay RB is energized by contact 83 (FIG. 4) which serves to check the return of the information drum scanning contacts 69 to their operating position (FIG. 9). Contact R$s$1 is closed since relay Rs is energized by limit contact 29 of the stop revolving jack (FIG. 2), by limit contact 144 of the capstan indexing jack (FIG. 8); and by contact R$h$1 since relay Rh is energized by contact 84 which is closed by the longitudinal bar 66 in the initial longitudinal position of the capstan.

Thus relay Ra is energized. Contact R$a$1 is closed and relay Rd is energized through this contact R$a$1 and the closed contact R$l$1. Contact R$d$1 closes, contact R$b$2 is closed, and contact 71*b*, which is controlled by the information drum 69 (FIG. 9) is also closed, so that relay Rc is energized while its contacts R$c$1 and R$c$2 close. This causes electro-magnet 123 and electro-magnet 116 to become energized. Energizing of electro-magnet 123 (FIG. 3) moves slide-valve 3 towards the left in this figure, so that chamber 46 of the longitudinal displacement jack of the capstan is connected with the hydraulic oil tank by conduit *b*, the space of slide-valve 3, conduit *e*, the space of slide-valve 129 (FIG. 4), and oil tank 137.

Energization of electro-magnet 116 (FIG. 6) disengages clutch 115, so that piston 5 of the jack moves rapidly carrying along the capstan in a rapid movement towards headstock 1 (FIG. 1).

The rapid movement of the capstan towards the headstock is converted into an operating advance movement, always towards the headstock, as soon as contact 71b actuated by information drum 69 (FIG. 9) is opened. This opening causes relay Rc to become de-energized so that contact Rc1 is opened, and shuts off the feeding of electro-magnet 123 (FIG. 6) so that the hydraulic feed during the rapid motion is interrupted while, at the same time, the opening of contact Rc2 deenergizes electro-magnet 116 so that clutch 115 is brought to engage. The closing of contact Rc3 leads to energizing of electro-magnet 111 by contacts Rb3, Rc3, Rd2 and Rh2. Energizing of electro-magnet 111 ensures engagement of the advance box on the kinematic chain which controls the rotation of the endless screw 113 (FIG. 6). Thus the longitudinal displacement of the capstan is carried out under the effect of the adjustment of the connection of the chamber 46 of the main jack with the hydraulic oil tank through conduit b, slide-valve 3 controlled by its own rotating motion together with the rotation of toothed wheel 117 about screw 118 longitudinally integral with the capstan, by conduit e (FIGS. 4 and 6), slide-valve 129 and oil tank 137, whereas the oil under pressure which is delivered by pump 138 (FIG. 6) is carried to chamber 45 of the main jack through conduits 120 and a.

This advance is used, for instance, for carrying out a turning off operation at the speed which has been called hereinabove the normal 1/1 speed.

To carry out an operating advance at slower speed, called low speed 1/x, dog-clutches 103a (FIG. 6) are made to engage by energizing electro-magnet 109a under the effect of the closing of contact 71d actuated by information drum 69 (FIG. 9). Thus, the energization of electro-magnet 109a produces, solely through the action of the feed box, a reduction of the rotating speed of endless screw 113 (FIG. 6), so that the longitudinal advance operating speed of the capstan is brought down at the same rate, since nothing else is modified in the remainder of the transmitting system.

Similiarly, closing of contact 71e actuated by information drum 69 (FIG. 9) which is actuated in turn by longitudinal bar 66 (FIG. 4), causes electro-magnet 109b to be energized and, hence, engagement of dog-clutches 103c instead of engagement of dog-clutches 103d within the feed box. The operating advance speed of the capstan is modified and assumes the value called slow speed 1/y.

When the limit of the operating stroke has been reached stop 86 (FIG. 4), which during operation is carried by stop bar 85 ensures closing of slide-valve 129 when the latter abuts against plate 130 and pushes the same back towards the left (in FIG. 4), slide-valve 129 acting to obturate the connection with oil tank 137. The operating advance movement of the capstan is stopped. Despite this hydraulic stop the kinematic chain which controls the rotation of slide-valve 3 (FIG. 6) temporarily continues turning the same. Now, the worm rack 118 integral with the capstan is stopped and immobilizes pinions 117 and 114. Slide-valve 3 which is extended by an endless screw 113 engaged on pinion 114 moves axially over a small distance and causes lever 126 to pivot so as to actuate switch 143 which causes electro-magnet 111 to be de-energized, and thus stops the rotating movement of slide-valve 3.

It is assumed that the work to be done now requires a transverse pivoting motion of the capstan with hydraulic adjustment, e.g. for a shoulder facing operation on the work-piece which is being machined.

This motion is ensured by energizing electro-magnet 36 (FIG. 2), for reasons which shall be explained hereafter, slide-valve 31 moves downwardly in FIG. 2, pump 138 delivers oil under pressure into chamber 19 of jack 17, while the oil contained in the other chamber 18 of said jack returns to oil tank 137 via conduit 136, delivery regulator 41, the chamber of slide-valve 31 and conduit 40. Piston 14 of jack 17 moves downwardly (FIG. 2) and causes the capstan 4 to pivot about a corresponding angle.

Electro-magnet 36 is energized by contact Ro1 of relay Ro which is energized by the three contacts Rk1, Rm1, and Rr1. Contact Rk1 is closed when relay Rk is energized by the closing of contact 143 (FIG. 6).

Contact Rm1 is closed because relay Rm is energized by contact 134 closed by information drum 131 (FIG. 3).

Contact Rr1 is closed since relay Rr is energized by contact 135 (FIG. 2), and by contacts Rm2 and Rn1, relay Rn being energized by contact 30 (FIG. 2), and by contact Ro2. When the transverse hydraulically regulated rotating advance movement comes to an end, plate 16 (FIG. 2) pushes back stop 22 in function.

The mechanical pressure which is then applied to this stop serves to push back valve 31 by means of lever 33 which is pivotable about axis 34, and causes the forces to be equilibrated on both sides of piston 14 thus provoking a precise stop of the transverse movement.

The downward displacement of stop bar 20 has actuated switch 42 which, owing to the directions implied by the new position of the capstan, shall permit the cycle to be continued, in accordance with the setting of the various auxiliary control mechanisms.

In the example considered the setting is as follows:

(1) The pivoted capstan shall be maintained in its resting position against stop 22;

(2) an inversed longitudinal operating advance movement shall be actuated.

Here we have the case of a particular cycle which depends on preselective information indicated on the perforated tracks 132 of drum 131 provided for this use.

Thus, switch 134 has previously established the energizing circuit of relay Rm the contact Rm1 of which has permitted the capstan to carry out its pivoting movement. On the other hand, contact Rm2 and switch 135 have energized relay Rr which serves to momentaneously maintain the capstan in the pivoted position.

Indeed, it has been noted previously that switch 42 was actuated during the stop of the pivoting movement. Relay Tp2 being energized by 42, contact Tp2a normally should have de-energized relay Ro which would have de-energized electro-magnet 36 and thus have caused the inverse pivoting motion of the capstan. However, this action of Tp2a is being annulled by contact Rr1 which is closed across the circuit. Thus, Ro remains energized and the capstan remains in its angular position.

The movement which is to follow consists in conferring to the capstan assembly an inverted longitudinal operating advance movement.

Since it is desired to obtain this inverted advance, and since the same is not obligatory, it is necessary to cause switch 71 to intervene which has been provided for this purpose on the longitudinal drum 68. This switch 71c establishes the energizing circuit for relay Re with the following contacts: Rr2 closed—Rj2 resting, Rk3 closed —and Rp1 which has just been closed by switch 42.

Note 1: Parallel to Re relay Rf is also energized by contact Rp1. This relay is called upon to control the rapid inverted longitudinal movement, by means of its contact Rf2 on time-delayed relay Tp1. In the present case, this action is being annulled by contact Re3 which has just been opened.

Note 2: The presence of time-delay relay Tp1 is made necessary by the fact that relays Re and Rd are energized simultaneously. Since the action of the first consists in momentaneously annulling the action of the second, it was necessary to delay the action of the first during the switching period of contacts Re3 and Rf2.

Thus, the inverted operating advance is ensured by contacts Re1 and Re2, which simultaneously energize clutch 111 (operating advance), and electro-magnet 109c (inverting of the advance).

The inverted advance is pursued until bar 66 acts upon switch 140 (or, if desired, until the opening of switch 71c which would cause rapid inverting until switch 140 is actuated).

Switch 140 energizes relay Rj through a circuit established with contact Rp4 (Rp being energized by 42, still informed).

At this moment Rj2 de-energizes relay Re the contacts Re1 and Re2 of which stop the inverted advance by disengaging 111 and 109c.

Simultaneously Rj4 interrupts the self-excitation of Rr. Contact Rr1 by leaving its "operating" position opens the maintaining circuit of Ro (contact Tp2 being already open since 42 has been informed).

The return of contact Ro1 to its "rest" position interrupts feeding of electro-magnet 36, which causes the return of the capstan to its initial angular position.

With contact Ro2 being at rest switch 30, which has been informed by the return to the initial position, energizes relay Rn.

Contact Rn2 is closed and energizes Rf through closed circuits Rp1 and Rj1, as well as Rh3 and Rs2 at rest.

Contact Rf2 and Re3 at rest energize the time-delayed relay Tp1 the contact Tp1a of which energizes electro-magnet 116.

This electro-magnet 116 disengages clutch 115 which permits valve 3 (FIG. 6) which is subjected to the hydraulic pressure applied in chamber 122, to move towards the right.

This displacement realizes on the one hand obturation of conduit e and, on the other hand, the connection between pressure inlet 121 and conduit b.

The differential thrusts which are applied at this moment in chambers 45 and 46 on both sides of piston 44 cause the rapid longitudinal displacement of the capstan towards its initial position opposed to the headstock.

When the head 124 (FIG. 6) of screw 118, which is longitudinally driven by the capstan, knocks against plate 125 it brings slide-valve 3 back to the position wherein it causes the return of the capstan to be stopped.

When the capstan resumes its initial position, bar 66 actuates switch 84 the closing of which leads to electro-valve 63 being energized so that chamber 82 of jack 59 (FIG. 4) is fed while fork 48 engages with roll 47 located in front thereof, switch 142 being actuated by the same jack which leads to electro-valve 58 (FIG. 8) being energized and, consequently, to feeding of chamber 57 of jack 50 the piston 51 of which causes crank pin 55 and shaft 49 to pivot in the direction of arrows f2, fork 48 (FIG. 7) pivots about the same angle, and the capstan pivots ⅕ turn in the direction of arrow f1. Simultaneously, star 87 (FIGS. 4 and 7) also pivots ⅕ turn and permits stop bar 85 to revolve while piston 26 (FIG. 2) withdraws (towards the left) under the effect of the pressure of the oil fed to jack 27 by conduit c temporarily fed by electro-valve 58 (FIG. 8).

Switch 145 (FIG. 8) opens when piston 51 has reached the limit of its angular capstan indexing stroke, which de-energizes electro-valve 63 (return movement of piston 60, and disengagement of fork 48 from roll 47). Switch 141 interrupts electro-valve 58, piston 51 resumes its position shown in FIG. 8, while piston 26 resumes its position shown in FIG. 2 and causes stop bar 20 to revolve ⅕ turn, by means of catches 24 and 24a and ratchet 23 which is integral with said bar.

The cycle is finished. With respect to the beginning of this cycle most of the members assume the same positions, but capstan 4 and stop bars 20 (FIG. 2) and 85 (FIG. 4) have been indexed ⅕ turn, another notch 7 (FIG. 2) of plate 6 integral with the capstan has come to engage on the angular advance prism 13 at the return of the capstan to its initial longitudinal position, the coupling of switches 133, 134, 135 (FIG. 2) may have been modified, and the position of switches such as 71 (FIG. 9) used for the scanning of the tracks 70 of programming drum 69 may have been modified under the action of the pivoting motion of cam 88 rotatably connected with stop bar 85.

The automatic repetition of a machining cycle is initiated by energizing relay Ra (FIG. 10–1) when switch 71a (cf. also FIG. 9) is being closed instead of being initiated by means of push-button B2.

Furthermore, in case not all of the faces of the capstan should be used it is possible to cause directly one or more renewals of the indexing, controlled by the presence of riders 97 (FIG. 5) which actuate switch 98.

The longitudinal situation of the capstan is controlled, on the side of the loose head, through switch 84 (FIG. 4) on its path, through switch 140 (same figure), and on the side of the head-stock through switch 143 (FIG. 6), all of which can be seen in the general electric layout.

As regards control of slide 10 (FIG. 2) for the angular advance movements of the capstan, the following features may be taken into consideration:

(a) Selection of special cycles for switch 134 and information drum 132 (FIG. 2);

(b) Upper position under control of switch 30 (also in FIG. 2);

(c) Downward movement actuation under control of electro-magnet 36;

(d) Lower stroke limit under control of switch 42 with time-lag through relay Tp2;

(e) Maintaining special cycles in the low position under control of switch 135 and information drum 132.

The origin of the indexing cycle is controlled by switches 29 (FIG. 2) and 144 (FIG. 8).

Finally, relay Rw controls an indexing memory capable of avoiding any undesirable capstan indexing repetition.

What I claim is:

1. A tool-holding capstan mounted so as to be capable of being subjected to a motion of translation in a parallel direction to the axis of the work-piece carrying spindle of the lathe and rotating movements about an axis parallel to said spindle in order to be able, on the one hand, to assume different angular indexing positions for which the tools carried by its faces successively present themselves at the operating station, and, on the other hand, to carry out an oscillating or angular balancing movement originating from each of said angular indexing positions in order to confer to the tools a transverse motion, said lathe being characterized by the fact that the member which maintains the capstan in each of the angular indexing positions thereof is movable on the frame of the lathe, between a stationary stop which determines said position and an end position which determines the position of maximum amplitude of the angular balancing movement of the capstan ensured by the movement of said maintaining member which permanently determines the angular position of the capstan under the action of convenient control means.

2. A lathe according to claim 1, characterized by the fact that the member which permanently determines the angular position of the capstan is constituted by a prismatic guide capable of receiving any one of a series of radial grooves with parallel sides provided at the periphery of a plate which is integral with the capstan, said guide being connected to a slide which is movable in an orthogonal direction with respect to the axis of the capstan and subjected to the action of the above-mentioned control means.

3. A lathe according to claim 2, characterized by the fact that the slide which carries the guide maintaining the angular position of the capstan is connected to one of the elements of a hydraulic jack which is stopped when equilibrated under the control of a hydraulic slide-valve controlled by a micrometric stop actuated by said slide.

4. A lathe according to claim 2, characterized by the fact that the location and length of the guide are such that the plate integral with the capstan is disengaged from said guide when the capstan has reached at least one of the two end positions of its motion of translation.

5. A lathe according to claim 2, characterized by the fact that the connection between the prismatic guide and the slide is constituted by hinge about an axis parallel to that of the capstan.

6. A lathe according to claim 3, characterized by the fact that the micrometric stop is carried by a stop bar which comprises as many of these micrometric stops as the capstan has tool receiving faces, said bar being mounted so as to be capable of being slightly displaced in the axial direction by the slide and of actuating the hydraulic slide-valve to carry the same to its position of equilibrium, as well as in the circumferential direction under the action of an indexing device capable of carrying each stop selectively onto the path of said slide.

7. A lathe according to claim 3, characterized by the fact that the hydraulic circuit of the jack comprises an adjustable throttle with variable cross-section capable of regulating the speed of the angular balancing movement of the capstan.

8. A lathe according to claim 1, characterized by the fact that the lathe is connected to a movable member of a hydraulic jack which controls the longitudinal displacement of said capstan, the stopping of said jack being caused by its being equilibrated under the control of a hydraulic slide-valve controlled by convenient auxiliary means.

References Cited by the Examiner

UNITED STATES PATENTS

| | | | |
|---|---|---|---|
| 2,148,348 | 2/1939 | Groene et al. | 82—21 X |
| 2,635,325 | 4/1953 | Walder | 29—42 |

ANDREW R. JUHASZ, *Primary Examiner.*

LEONIDAS VLACHOS, *Examiner.*